GEORGE J. RIBLET.
Improvement in Tire-Bending Machines.
No. 114,476.    Patented May 2, 1871.
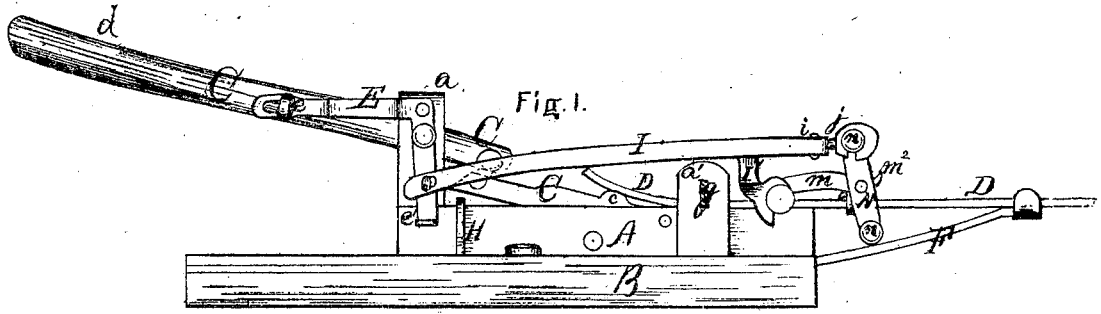
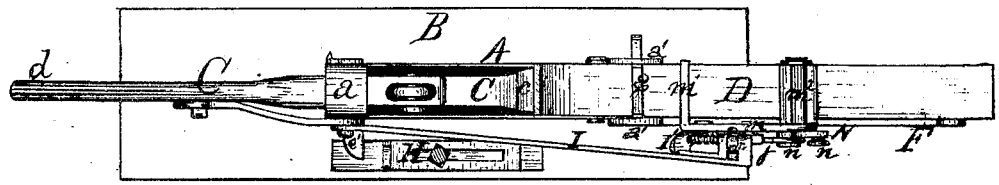
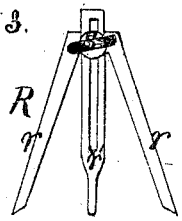 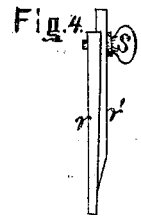
Witnesses.
Inventor
George J. Riblet
By Hill & Ellsworth
Attys.

United States Patent Office.

GEORGE J. RIBLET, OF BOOTHEVILLE, WEST VIRGINIA.

Letters Patent No. 114,476, dated May 2, 1871.

IMPROVEMENT IN TIRE-BENDING MACHINES.

The Schedule referred to in these Letters Patent and making part of the same.

*To all whom it may concern:*

Be it known that I, GEORGE J. RIBLET, of Bootheville, in the county of Marion and State of West Virginia, have invented an Improved Machine for Bending Tires; and I do hereby declare the following to be a full, clear, and exact description of the same, reference being had to the accompanying drawing forming part of this specification, in which—

Figure 1 is a side elevation;
Figure 2, a top view of the machine; and
Figures 3 and 4 are respectively a front view and side view of the gauge.

Similar letters of reference in the accompanying drawing indicate corresponding parts.

The object of this invention is to provide for public use a convenient, simple, and powerful machine for bending tires. To this end, The invention consists in the construction which I will now proceed to describe, such construction comprising the following parts, viz.:

First, a suitable supporting-frame;
Second, a compound lever by which the tire is bent;
Third, an adjustable stop for limiting the movement of the lever according to the curve of the tire to be formed;
Fourth, a staple and guide to hold the bar while it is forming into a tire;
Fifth, an adjustable feeding-clamp; and
Sixth, a connecting-bar by which the feed-clamp is operated from the working-handle of the compound lever.

In the drawing—

B is a wooden base.

A is the supporting-frame, made of cast-iron in the form of an open oblong box.

C is the compound lever constructed with a projection, $c$, that works against and bends the tire.

$a$ is a slotted standard supporting the working-handle $d$ of the lever C.

D is the bar to be bent, one end of which rests on the projection or boss $c$ and the other upon a flanged supporting and guiding-arm, F.

$a'g$ is a staple for holding the tire down at the point where it is bent, said staple consisting of two standards, $a'$ $a'$, cast upon the frame A, and a cross-plate or key, $g$, supported in slots in the standards; and extending across the bar E is a right-angled lever, pivoted to the post $a$, and connected at one end by a slot and pin, $e$, to the handle $d$, while the other end is bent outward, as shown at $e'$, so as to strike an adjustable stop, H, when the handle of the lever is worked, and thereby limit the movement of the levers and cause them to bend the bar to a circle of any desired size.

I is a rod connecting the lever E to the feed-clamp, and constructed with an extension-piece, $j$, at its end, adjustable by means of a screw-nut, $i$, working on a stem between two lugs on the part I, as shown.

$m$ $m^1$ $m^2$ is the feed-clamp, consisting of a curved plate, $m$, bent across at its front end above the bar D, as shown at $m^1$, and at its rear end bent down across under the bar and up on the opposite side thereof, so as to support a pivoted clamping-plate, $m^2$, which can be rocked on its axis by means of a lever, N; and I' is a rigid arm, extending down from the bar I, and having a shoulder which, when said bar is moved to the right, as represented in the drawing, strikes a pin projecting from the feed-clamp and moves the latter back to take a fresh hold of the bar.

The extension-piece $j$ has an open slot which fits over a headed pin, $u$, on the side of lever N, and when the rod I is drawn to the left rocks the clamp $m^2$ on its journals and causes it to grasp and move forward the bar D, and to liberate it again whenever the rod reverses its movement.

The clamp-plate $m^2$ is made with two biting edges, and can be turned to work with either. The lever N likewise has two arms, either of which may be connected to the rod I $j$.

One of the edges of the plate, and one of the arms of the lever may be longer than the other, so as to adapt them, by simply reversing their position, to work with thicker or thinner bars D.

In combination with the apparatus above described for bending the tire I employ a gauge, R, represented in figs. 3 and 4, for determining the proper curvature thereof. Said gauge is constructed with two legs, $r$ $r$, which incline away from each other like the legs of a pair of dividers, but are not movable. Between them is an adjustable pointer, $r'$, which can be fixed at any required height by means of a slot and set-screw, $s$.

The practical operation of these parts is as follows:

The bar to be bent is first scalloped at each end to fit it for welding. The gauge is then set to the curve of the wheel by laying it on the wheel, adjusting the slot and set-screw so that the three points of the gauge will correspond to the curve. One end of the bar is then bent to the curve indicated by the gauge, and passed through the feed-clamp and under the plate $g$, as shown in fig. 1, until that point of the bar where the curve begins is fairly under said plate $g$. The operator then, by means of the handle $d$, raises the lever C until the projection $c$ touches the bar, and holding it in that position adjusts the gauge or stop H so that it will just touch the lower end of the lever E. The parts are now all in their proper position, and by simply working the lever C with one hand the bar will be fed to the machine and rapidly and easily bent into the required circle. One edge of the key-plate $g$ is cut away, so that by drawing out said key-plate and turning it over a bar of different thickness or width may be bent, and with two keys four sizes of bars may be worked.

This machine bends to a truer circle and is worked more easily than any heretofore brought into public use, one hand being all that is necessary to bend the largest tire, and no part of the mechanism being liable to fracture or rapid wearing out.

Having thus described my invention,

What I claim as new therein, and desire to secure by Letters Patent, is—

1. The frame A $a$ $a'$ and plate $g$ in combination with the compound lever C and guide-arm F, all constructed and arranged substantially as herein shown and described.

2. The right-angled lever E and adjustable stop H, in combination with the lever C, substantially as and for the purpose specified.

3. The feeding-clamps $m$ $m^1$ $m^2$ N, constructed to operate in connection with the bar D and rod I, substantially as described.

4. The combination of the extension-piece $j$ and adjusting-nut $i$ with the bar I and feeding-clamp apparatus, as described, and for the purpose specified.

5. The combination of the lever E with the lever $d$, rod I, and clamping apparatus $m$ $m^1$ $m^2$ N, substantially as and for the purpose set forth.

GEO. J. RIBLET.

Witnesses:
    EDMUND WATKINS,
    JOHN W. POWELL.